(12) United States Patent
Coronado et al.

(10) Patent No.: US 7,464,835 B2
(45) Date of Patent: Dec. 16, 2008

(54) PREPARING AND DISPENSING MIXED BEVERAGES

(75) Inventors: Juan Carlos Coronado, Barcelona (ES); Vicenc Font, Barcelona (ES); Antonio Rebordosa, Sant Fruitos de Bages (ES); Jose Luis Roman, Sant Just Desvern (ES)

(73) Assignee: Braun GmbH, Kronberg (DE)

( * ) Notice: Subject to any disclaimer, the term of this patent is extended or adjusted under 35 U.S.C. 154(b) by 179 days.

(21) Appl. No.: 10/666,325

(22) Filed: Sep. 18, 2003

(65) Prior Publication Data

US 2004/0118871 A1    Jun. 24, 2004

(30) Foreign Application Priority Data

Dec. 19, 2002 (DE) ............................. 102 60 040
Feb. 13, 2003 (DE) ............................. 103 05 881

(51) Int. Cl.
*B67D 5/56* (2006.01)

(52) U.S. Cl. .................... 222/145.6; 222/129.1

(58) Field of Classification Search .............. 222/129.1, 222/132, 145.5, 145.6, 227; 99/289 R, 323.3, 99/287

See application file for complete search history.

(56) References Cited

U.S. PATENT DOCUMENTS

| | | | | |
|---|---|---|---|---|
| 3,266,670 A | * | 8/1966 | Brooks et al. | 222/54 |
| 3,588,055 A | | 6/1971 | De Jong | |
| 4,185,927 A | | 1/1980 | Uttech | |
| 4,191,101 A | * | 3/1980 | Ogawa et al. | 99/323.3 |
| 4,245,680 A | * | 1/1981 | Greenfield et al. | 222/132 |
| 4,328,740 A | | 5/1982 | McDonough et al. | |
| 4,357,861 A | * | 11/1982 | Di Girolamo | 99/323.3 |
| 4,676,401 A | * | 6/1987 | Fox et al. | 222/1 |
| 4,694,740 A | * | 9/1987 | Daloz | 99/323.3 |
| 5,348,195 A | * | 9/1994 | Pajot | 222/227 |
| 5,492,054 A | * | 2/1996 | Schneeberger | 99/289 R |
| 5,497,907 A | * | 3/1996 | Gmuer et al. | 222/58 |
| 5,740,946 A | * | 4/1998 | Swier et al. | 222/129.1 |
| 6,766,656 B1 | * | 7/2004 | Crisp et al. | 62/389 |
| 7,036,687 B1 | * | 5/2006 | Lowe | 222/145.5 |

FOREIGN PATENT DOCUMENTS

| | | |
|---|---|---|
| DE | 2053 313 | 5/1972 |
| DE | 38 38 683 | 5/1990 |

(Continued)

*Primary Examiner*—J. Casimer Jacyna
(74) *Attorney, Agent, or Firm*—Fish & Richardson P.C.

(57) ABSTRACT

A beverage mixer and dispenser is disclosed. The housing of the beverage mixer and dispenser includes a mixing chamber and an extract container positioned above the mixing chamber. A metering device is positioned between the extract container and the mixing chamber to allow dispensing of a desired amount of extract from the extract container into the mixing chamber. The beverage mixer and dispenser includes a feed opening, which is exposed at an exterior surface of the housing and leads into the mixing chamber to allow for manual addition of drink additives to the mixing chamber. The beverage mixer and dispenser also includes a cream chamber. The cream chamber is adapted to receive a liquid-extract combination from the mixing chamber. A rotatable mixing rotor is positioned within the mixing chamber and a rotatable first cream rotor is located within the cream chamber to provide thorough mixing of the liquid-extract-cream combination.

27 Claims, 8 Drawing Sheets

FOREIGN PATENT DOCUMENTS

| | | |
|---|---|---|
| DE | 693 02 558 | 9/1996 |
| DE | 200 06 115 | 7/2000 |
| EP | 0 201 767 | 11/1986 |
| EP | 0 727 165 | 8/1996 |
| EP | 1 179 175 | 4/2002 |

* cited by examiner

PREPARING AND DISPENSING MIXED BEVERAGES

CROSS REFERNCE TO RELATED APPLICATION

This application claims priority to German Patent Application No. DE 103 05 881.8, filed Feb. 13, 2003 and DE 102 60 040.6, filed Dec. 19, 2002, which are incorporated herein by reference in their entirety.

TECHNICAL FIELD

This invention relates to preparing and dispensing mixed beverages.

BACKGROUND

Some machines that prepare and dispense mixed beverages include a mixing chamber arranged in a housing. In some cases, the mixing chamber has a filling opening in its upper region and at least one extract container arranged above the filling opening to accommodate coffee or other powdery soluble extracts. The housing also has a metering device for the extract container, allowing for metering the chosen powdery soluble extract into the mixing chamber via a metering opening. Inside the mixing chamber, the extract supplied from the metering device is mixed with a hot liquid such as water to produce a beverage.

Some such machines have more than one extract container, which can be filled with various powdery soluble extracts. According to the user's selection, a portion of the chosen extract will be supplied to the mixing chamber from the appropriate extract container and mixed therein with a liquid, such as hot water, to make a beverage. However, since the number of extract containers must be quite limited for reasons of overall size, a selection can only be made from a few different extracts for mixed beverages. The wide range of powdery soluble extracts for mixed beverages which are commonly available can thus not be utilized. Examples of such mixed beverages from soluble extracts are coffee, white coffee, espresso, decaffeinated coffee, chocolate, cappuccino, tea, milk and coffee with cocoa. It is desired to make such machines more flexible in the choice of available beverage selections and beverage additives.

In many such machines, the powdery soluble coffee extract and, if necessary, milk powder, are dispensed into a funnel-shaped mixing chamber and dissolved by means of hot water which flows in via the hot water supply. For mixing the hot water supply with the coffee extract the hot water supply is directed into the mixing chamber approximately at right angles to the axis of rotation of the first cream rotor and approximately tangentially to the side wall of the mixing chamber. To form a circulating flow in the mixing chamber, the hot water must flow into the mixing chamber at a certain minimum pressure, such as by direct connection to a pressurized water pipe (potentially limiting flexibility of positioning and moving such machines once installed), or by incorporating a pump. Other means of improving the mixing and aeration of hot beverages in such machines are desired, preferably at lower cost and greater convenience.

SUMMARY

According to one aspect of the invention, a beverage machine has a mixing chamber. The mixing chamber has an opening in its upper region, so that drink extracts can be added. The drink extracts are stored in extract containers positioned above the upper opening of the mixing chamber. There is a metering device between the extract containers and the mixing chamber to dispense the desired amount of drink extract from the container into the mixing chamber, where it is mixed with liquid in the mixing chamber to produce a beverage. According to this aspect of the invention, there is also a feed opening, accessible from outside the machine, which leads into the mixing chamber, for adding drink additives manually to the mixing chamber.

If none of the existing extract containers is filled with the powdery soluble extract from which the user chooses to prepare a beverage, he can supply the extract manually through the feed opening to the mixing chamber where the beverage is prepared. This means that large numbers of extract containers are not necessary to provide a large selection of drink extracts.

In some embodiments, the feed opening is part of the upper opening.

Preferably, the mixing chamber is positioned in a chamber housing that can be moved between a position in which the upper opening is directly below the metering device, and a position in which the feed opening is exposed for adding drink additives. The chamber housing for the mixing chamber can either be linearly translatable between the first and second positions, or it can pivot between the two positions. This makes the mixing chamber accessible so that it can easily be cleaned while in place. It is also easy to remove the mixing chamber, which is constructed as a replaceable part, for cleaning purposes.

In some embodiments, part of the upper opening of the mixing chamber is covered by the extract container, and another part of the upper opening comprises the feed opening. Another embodiment includes a lid for closing the exposed feed opening. The lid can be opened to add drink extract. In some cases, the lid is pivotable on the housing. These configurations make the feed opening easily accessible to a user.

According to another aspect of the invention, there is a mixing chamber inside of a housing, with an upper opening for the addition of drink extracts. There are one or more extract containers positioned above the opening, with metering devices that dispense the appropriate amount of drink extract into the mixing chamber. There is also a feed opening which leads to the mixing chamber. A mixed beverage can be produced by manually adding a drink extract to the feed opening of the machine. After that, hot water is added to the mixing chamber and mixed with the drink extract to make a hot beverage. The beverage is then dispensed into a receiving vessel beneath the mixing chamber.

In some embodiments, a desired amount of powdery drink extract from the extract container can be dispensed into the mixing chamber, and an additional powdery substance can be added through the feed opening, such that the hot beverage contains both a powdery, soluble substance and the drink extract. The powdery soluble substance may be a drink additive.

In other embodiments, the powdery soluble substance can be a drink extract different from those in the extract containers. When mixed with hot water, a hot beverage is produced.

In some embodiments, there is a feed chamber, which defines the feed opening. The feed chamber is connected to the mixing chamber by a transport system.

According to anther aspect of the invention, a beverage machine has a mixing chamber inside of a housing. The mixing chamber has an upper opening, and the housing also has an extract container positioned above the upper opening of the mixing chamber. The extract container contains powdery soluble drink extract. There is also a means for dispensing a metered amount of the drink extract from the extract container into the mixing chamber through the upper opening, for mixing with liquid in the mixing chamber to produce a beverage. Furthermore, there is a means for manually adding a soluble substance directly into the mixing chamber through a feed opening.

According to another aspect of the invention, a beverage machine has a mixing chamber inside of a housing. Powdery drink extract and hot water are joined in the mixing chamber to produce hot beverages. The mixing chamber also has a lower outlet that leads to a cream chamber below the mixing chamber. There is a rotatable mixing rotor in the mixing chamber to mix the hot water and powdery drink extracts, and a rotatable first cream rotor in the cream chamber to mix cream into the hot beverage. The cream chamber has an outlet through which the creamy, mixed beverage flows into a receiving vessel for drinking.

One advantage to this aspect is that the beverage is very thoroughly mixed, first by the mixing rotor and then by the first cream rotor. This leads to a very frothy, well-mixed beverage. Another advantage is that a pressurized water source is not necessary. Water may drip or flow into the mixing chamber at any speed and thorough mixing can still take place.

One embodiment has an extract container positioned above the mixing chamber and containing a quantity of powdery drink extract. There may be a metering device disposed below the extract container for dispensing a measured amount of drink extract into the mixing chamber for mixing with hot water.

Some embodiments include a feed opening leading into the mixing chamber for manual addition of a drink additive.

In some cases, the lower portion of the mixing chamber is funnel-shaped. In some embodiments, the mixing rotor is located in the lower portion of the mixing chamber.

The water drops hitting this conical region at high speed are deflected towards the top of the mixing chamber and from there fall radially inwards in an arc and again onto the mixing rotor so that a mixing cycle is formed which ensures especially thorough mixing of water and soluble extract. This mixing cycle also ensures that particles of the soluble extract cannot settle on the walls of the mixing chamber but are flushed away by the flow of liquid. This serves to keep the mixing chamber clean.

Preferably, the mixing rotor is smooth. The first cream rotor may also be smooth. In some embodiments, the mixing rotor is a circular disk. The first cream rotor may also be a circular disk. If the mixing rotor and/or the first cream rotor are constructed as approximately disk-shaped, and, in particular, circular-disk-shaped, the liquid impacting on the surface of the rotating mixing rotor or first cream rotor is thrown radially outwards as a thin film by the centrifugal force. The film then breaks up into fine drops which impact at high speed on the side walls of the mixing chamber and the cream chamber. This leads to a good mixing quality in the mixing chamber and a high air-bubble permeation in the cream chamber. By this means, thorough mixing is ensured even for small quantities of drink.

In other embodiments, the mixing rotor is driven by a shaft extending from a lower surface of the mixing rotor. The first cream rotor may be driven by a shaft extending from a lower surface of the mixing rotor as well.

For certain applications, the mixing rotor in the non-rotating state is constructed as approximately cup-shaped with its circumferential edge enclosing the mixing chamber's lower outlet. The circumferential edge abuts against the dividing wall between the mixing chamber and the cream chamber, thereby sealing the outlet. When the mixing rotor is rotating, however, it acquires an approximately flat shape under the action of centripetal force, thereby releasing the seal.

In some embodiments, the first cream rotor, in the non-rotating state, is constructed as approximately cup-shaped with its circumferential edge enclosing the mixing chamber's lower outlet. The circumferential edge abuts against the dividing wall between the mixing chamber and the cream chamber, thereby sealing the outlet. When the first cream rotor is rotating, however, it acquires an approximately flat shape under the action of centripetal force, thereby releasing the seal.

Preferably, there is a second cream rotor below the first cream rotor and rotationally fixed on the drive shaft. It may extend approximately radially in a disk shape, having preferably a larger diameter than the first cream rotor.

In some embodiments, there is a valve in between the mixing chamber and the cream chamber to block flow through the outlet of the mixing chamber. This would only open the outlet to the cream chamber after thorough mixing, so that the resulting beverage would be well-mixed. In some embodiments, the valve comprises a circumferential edge of the first cream rotor.

For some applications, there is a water inlet directed into the mixing chamber and arranged to aim water directly onto the mixing rotor. Directing the liquid onto the mixing disk brings about an especially rapid and internal mixing.

Preferably, the water inlet directs water into the mixing chamber coaxially along the axis of the mixing rotor. This allows a uniform distribution of the water in the mixing chamber to be achieved.

In some embodiments, the first cream rotor and the mixing rotor are driven by the same motor, and are arranged coaxially along an axis of rotation. The first cream rotor and the mixing rotor may be rotatably drivable about a common axis of rotation.

In embodiments where the first cream rotor and the mixing rotor are spaced apart along a single drive shaft extending from a drive motor, only one rotating drive is necessary. Furthermore, no additional lead-in opening is then required for the drive shaft. The drive motor may also be an electrical motor below the cream chamber. In this case, the mixing chamber can be filled with water and soluble extract from the top of the mixing chamber, unhindered.

According to another aspect of the invention, a beverage machine has a mixing chamber in which powdery drink extract and hot water are joined to produce hot beverages. The mixing chamber has a lower outlet and a cream chamber below it to receive hot beverages from the outlet of the mixing chamber. There is a rotatable mixing rotor in the mixing chamber to mix the hot water and powdery drink extracts and a rotatable first cream rotor in the cream chamber to cream the hot beverage, which can be made by adding hot water to the mixing chamber, manually adding a powdery substance to the mixing chamber and activating the mixing and cream rotors to mix the hot water and powdery substance to form a mixture. The mixture then flows from the mixing chamber into the cream chamber for aerating to form a hot, creamy beverage. A receiving vessel may be placed beneath an outer outlet from the cream chamber, to catch the hot, creamy beverage.

If none of the existing extract containers is filled with the powdery soluble extract from which the user would like to prepare a mixed drink, he can supply this desired extract manually through the separate feed opening to the mixing chamber wherein the desired mixed drink is then prepared. For this purpose it is not necessary to decant an extract container.

One possibility for a feed opening consists in one part of the filling opening of the mixing chamber being covered by the extract container or containers and the other part of the filling opening forming the feed opening. In this case, the part of the filling opening forming the feed opening can be freely exposed, and is thus easily accessible by the user. In order to be able to keep the mixing chamber closed during the preparation process, the other part of the filling opening forming the feed opening can be closable by a cover which can be pivoted on the housing in a simple fashion.

Another possibility for a feed opening consists of the mixing chamber being located in a receiver which is arranged in the housing such that it can be moved from a working position in which the filling opening is completely or partly covered by the extract container or containers, into a feed position in which the filling opening forming the feed opening is freely exposed. This allows good accessibility to the mixing chamber so that it can easily be cleaned while in place. It is also easy to remove a mixing chamber, which is constructed as a replaceable part, for cleaning purposes.

The receiver of the mixing chamber can either be moveable linearly from its working position into its feed position or it can be swiveled about a horizontal or vertical swivel axis from its working position to its feed position.

Another possibility is for the feed opening to be constructed in the upper region of a feed chamber of the housing and the further powdery soluble extract can be conveyed from the feed chamber to the mixing chamber by means of a transport system.

For dispensation of the beverage, the mixing chamber has an outlet which in particular leads outwards via an outlet connecting piece. A drinking vessel into which the mixed drink can run can be placed below this outlet.

A thoroughly-mixed mixed beverage can be obtained from a well dissolved powdery extract if a mixing rotor (which can be motor-driven) about an axis of rotation is located in the mixing chamber.

Particularly for the preparation of coffee, there can be located below the mixing chamber a cream chamber connected or connectable to the mixing chamber in which a first cream rotor (which can be motor-driven) about an axis of rotation is located and in which a cream covering the coffee is produced. In one design the mixing rotor and/or the first cream rotor can be driven by an electrical motor.

In designs with a cream chamber, said cream chamber has an outlet which leads outwards via an outlet connecting piece.

This also accomplishes the purpose of making mixed beverages without the need for a pressurized water source. The mixing chamber and the mixing rotor are arranged so that when water flows in, the missing rotor makes contact with it by being dipped in or immersed. Using a mixing rotor that the water can drip onto alleviates the need for pressurized water flow. The water is broken up into fine droplets by the rotational movement of the mixing rotor and thrown approximately radially towards the side wall of the mixing chamber. There the drops dissolve the powdery soluble extract. The mixture then flows to the bottom of the mixing chamber and through the outlet into a drinking receptacle.

Another possibility is for the mixing chamber to have an outlet to a cream chamber. In the cream chamber, the mixed liquid is likewise broken up into fine drops by the first cream rotor, thrown radially towards the side wall of the cream chamber and is thereby internally permeated with extremely small air bubbles so that an especially good frothy cream is produced. The drink flowing out through the outlet opening is then received, for example, by a drinking vessel and has been aerated such that it has a good frothy cream on its surface.

One possibility is to direct the liquid onto the mixing disk. This brings about an especially rapid and internal mixing.

In order to reduce the overall size, the first cream rotor and the mixing rotor can be rotatably driveable about a common axis of rotation which extends from the mixing chamber into the cream chamber. Only a single rotating drive is necessary if the mixing rotor and the first cream rotor are arranged rotationally fixed at a distance one from the other on a drive shaft of a common drive motor.

The outlet to the cream chamber is small, therefore, the liquid slowly leaves the mixing chamber. This results in better mixing. The outlet can, however, also be provided with an electrically actuatable valve which only releases the path to the cream chamber after thorough mixing.

Another possibility is for the drive motor to be an electrical motor which is located in the area below the bottom of the cream chamber so that filling of the mixing chamber with water and soluble extract from the top of the mixing chamber is unhindered.

If the mixing rotor and/or the first cream rotor are constructed as approximately disk-shaped, and, in particular, circular-disk-shaped, the liquid impacting on the surface of the rotating mixing rotor or first cream rotor is thrown radially outwards as a thin film by the centrifugal force The film is then broken up into fine drops which impact at high speed on the side walls of the mixing chamber and the cream chamber. This leads to a good mixing quality in the mixing chamber and a high air-bubble permeation in the cream chamber. Thus, thorough mixing is ensured even for small quantities of drink.

The mixing chamber preferably has a feed opening at its top through which the hot water from the hot water supply can be poured into the mixing chamber.

The mixing rotor and the first cream rotor can easily be driven jointly if the axis of rotation of the mixing rotor and the first cream rotor extend approximately coaxially to the outlet. In this case, no additional lead-in opening is required for the drive shaft.

Another possibility is to locate the mixing motor in the approximately conical bottom area of the mixing chamber. The water drops impacting on this conical region at high speed are deflected towards the top of the mixing chamber and from there fall radially inwards in an arc and again onto the mixing rotor so that a mixing cycle is formed which ensures especially thorough mixing of water and soluble extract. This mixing cycle also ensures that particles of the soluble extract cannot settle on the walls of the mixing chamber but are flushed away by the flow of liquid. This serves to keep the mixing chamber clean.

In order to achieve a uniform distribution of the water in the mixing chamber, the mouth of the hot water supply can be directed approximately coaxially towards the axis of rotation.

If the outlet is closable, thorough mixing of the liquid can first take place before the mixed liquid is passed into the cream chamber.

One possibility is for the first cream rotor in the non-rotating state to be constructed as cup-shaped with its radially circumferential edge enclosing the outlet. The circumferential edge abuts against the dividing wall between the mixing chamber and the cream chamber in a sealing fashion. And, in the rotating state, the first cream rotor acquires an approximately flat shape under the action of centrifugal force.

For separate cream production, a second cream rotor can be arranged rotationally fixed on the drive shaft on the side of the first cream rotor facing away from the outlet, whereby the second cream rotor extends approximately radially in a disk shape and preferably has a larger diameter than the first cream rotor.

Another possibility for the formation of a valve without especially moveable drivable valve parts exists when the mixing rotor is constructed as approximately cup-shaped in the non-rotating state with its radially circumferential edge enclosing the outlet. The circumferential edge abuts against the bottom of the mixing chamber in a sealing fashion. And, in the rotating state, acquires an approximately flat shape under the action of centrifugal force.

In order to further ensure that the valve is securely closed in the non-rotating state and the water can first be poured into the mixing chamber without running immediately into the cream chamber, the first cream rotor and/or the mixing rotor can have a ring-shaped sealing bead or a ring-shaped sealing lip on its radially circumferential edge.

DESCRIPTION OF DRAWINGS

Like reference symbols in the various drawings indicate like elements.

DETAILED DESCRIPTION

The apparatus for the preparation of mixed drinks shown in the drawings has a housing 1 with a base section 2 which has a drinking vessel recess 3 in which a drinking vessel 4 can be placed.

Adjacent to the drinking vessel recess 3 in the base section 2 of the housing 1 there is located a receiver 5, 5', 5" which has a funnel-shaped mixing chamber 6. In its upper region the mixing chamber 6 has a filling opening 7.

Two extract containers 8, 8' to respectively accommodate a specific type of powdery soluble extract are arranged above the filling opening 7. Powdery soluble extract can be supplied to the mixing chamber 6 from a metering opening 33, 33' of each extract container 8, 8', by means of a metering device 32. Water, for example hot water, can be supplied to the mixing chamber 6 from a water supply device 18.

Located in the receiver 5, 5', 5" is an electrical motor 20 to drive a mixing rotor 26 located in the mixing chamber 6 by which means a portion of powdery soluble extract supplied to the mixing chamber 6 can be mixed with water supplied by the water supply device 18 until the powdery extract is completely dissolved in the water and a mixed beverage is produced.

Figure 1:
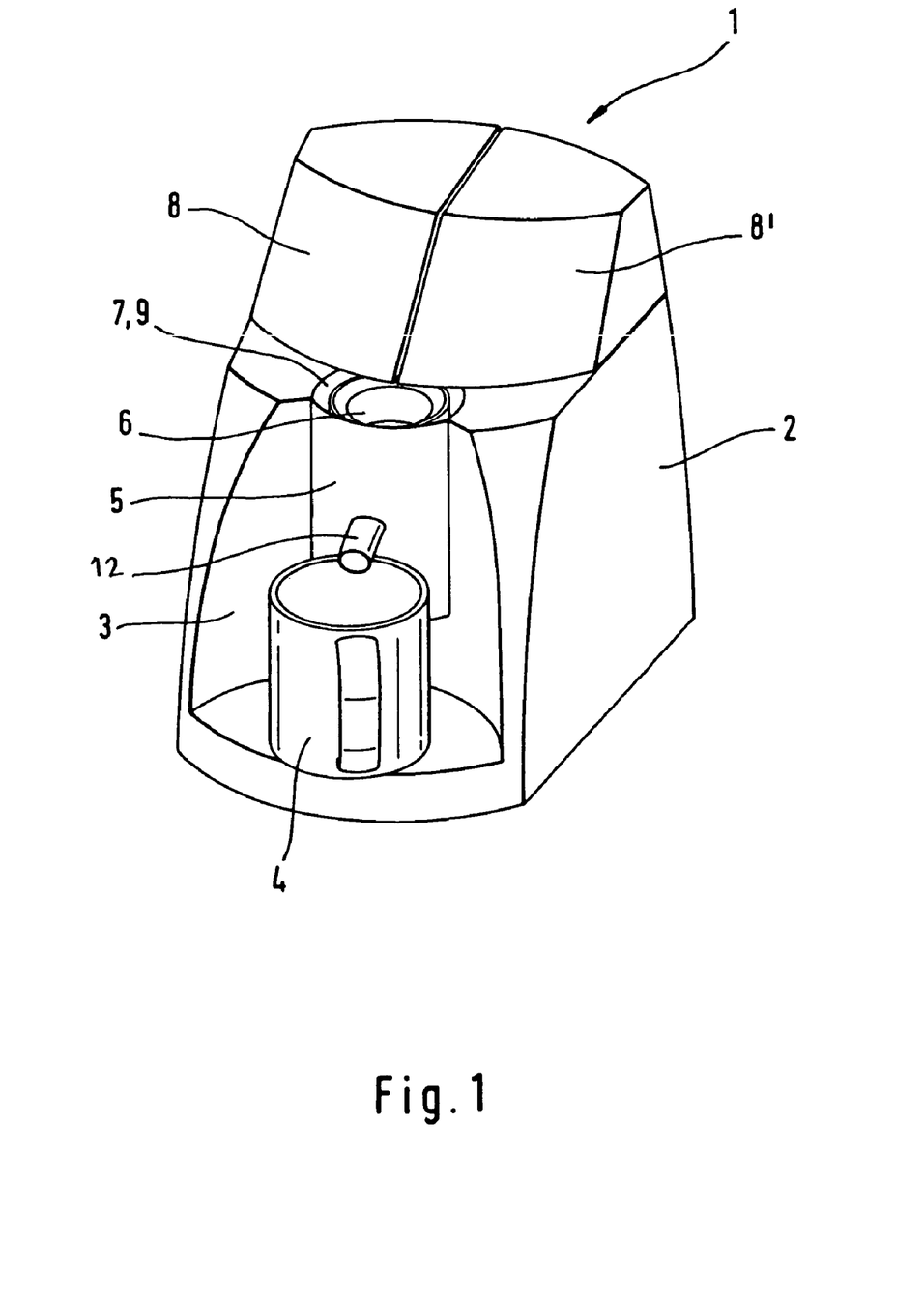
FIG. 1 is a perspective view of a first embodiment of an apparatus for the preparation of beverages.
Figure 6:
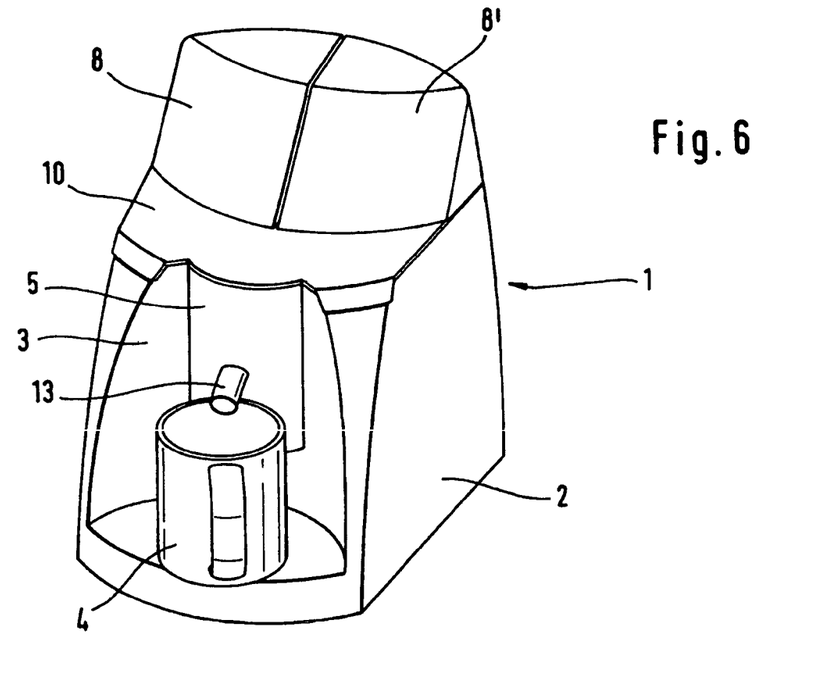
FIG. 6 is a perspective view of a fourth embodiment of an apparatus for the preparation of beverages in the working position.
Figure 7:
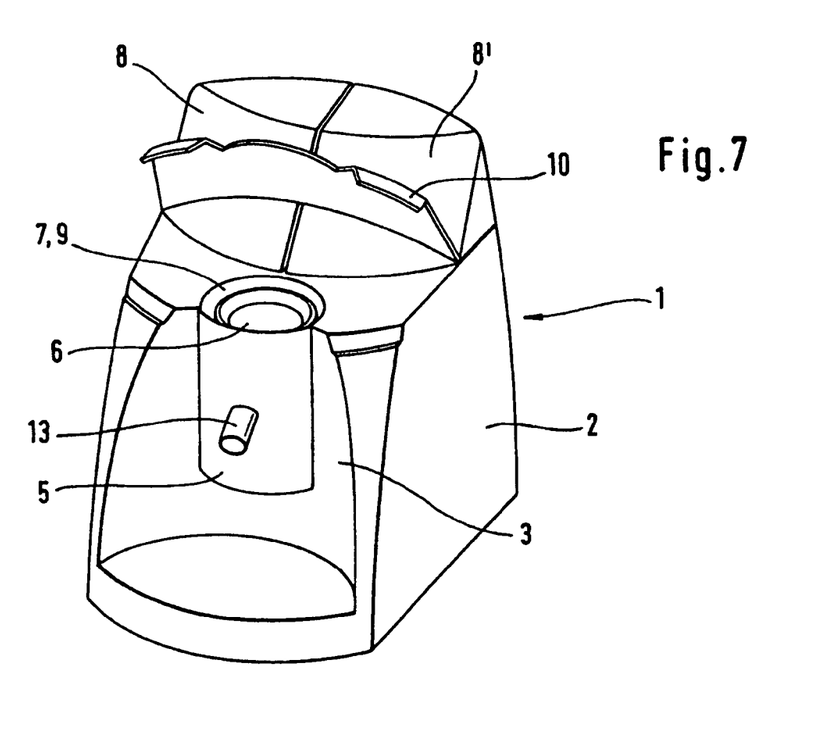
FIG. 7 shows the apparatus from FIG. 6 in the feed position.

As shown in FIGS. 1, 6 and 7, the filling opening 7 of the mixing chamber 6 is only partly covered by the extract containers 8, 8', while the other part of the filling opening 7 forms a feed opening 9 into which a different powdery soluble extract from the soluble extracts in the extract containers 8, 8' can be poured manually and supplied to the mixing chamber 6.

In FIG. 1, the feed opening 9 is freely exposed, whereas in FIGS. 6 and 7, it is closable by a lid 10. The lid 10 is pivoted on the housing 1.

In FIGS. 2-6 the filling opening 7 is completely covered by the extract containers 8, 8'. in FIGS. 2-5, the mixing chamber 6 is arranged as a replaceable part in a receiver 5', 5" which is located in the base section 2 of the housing 1 so that it is moveable from a working position (FIGS. 2 and 4) to a feed position (FIGS. 3 and 5) in order to allow manual pouring of a powdery extract from the extract containers 8, 8' into the mixing chamber 6.

Figure 2:
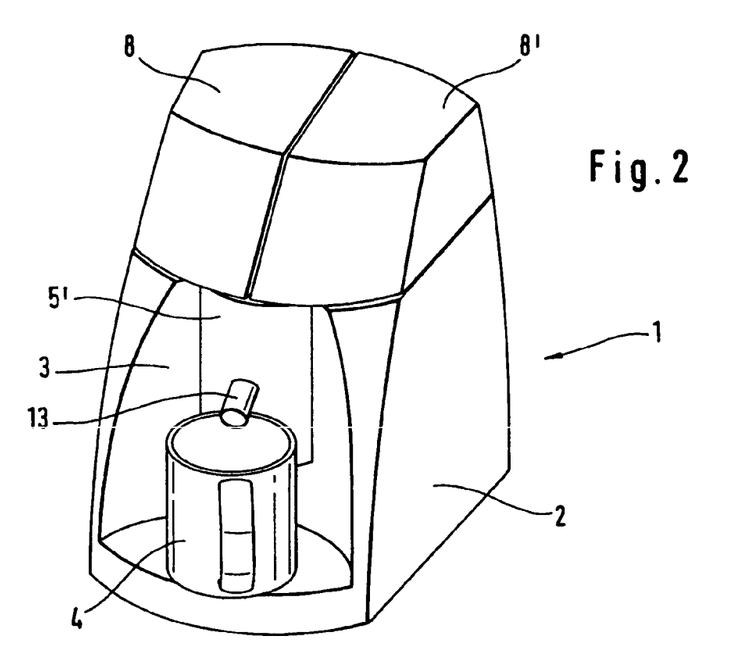
FIG. 2 is a perspective view of a second embodiment of an apparatus for the preparation of beverages in the working position.
Figure 3:
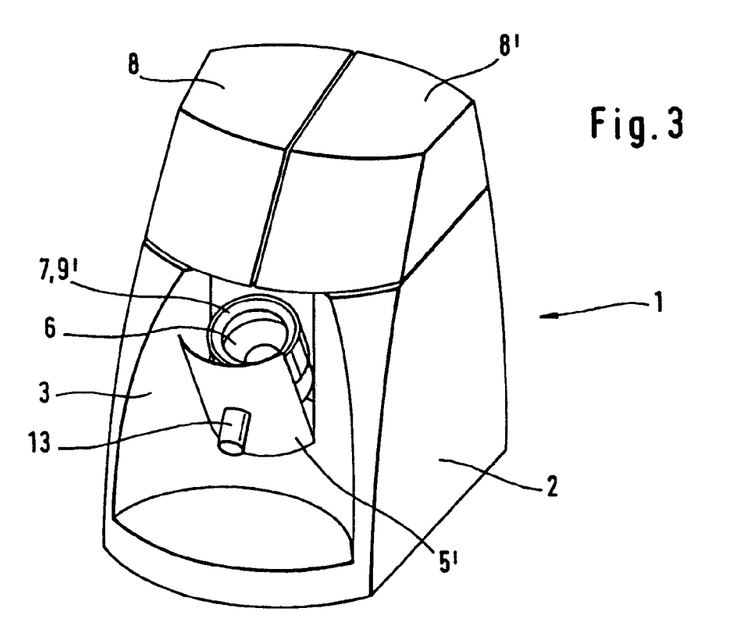
FIG. 3 shows the apparatus from FIG. 2 in the feed position.
Figure 4:
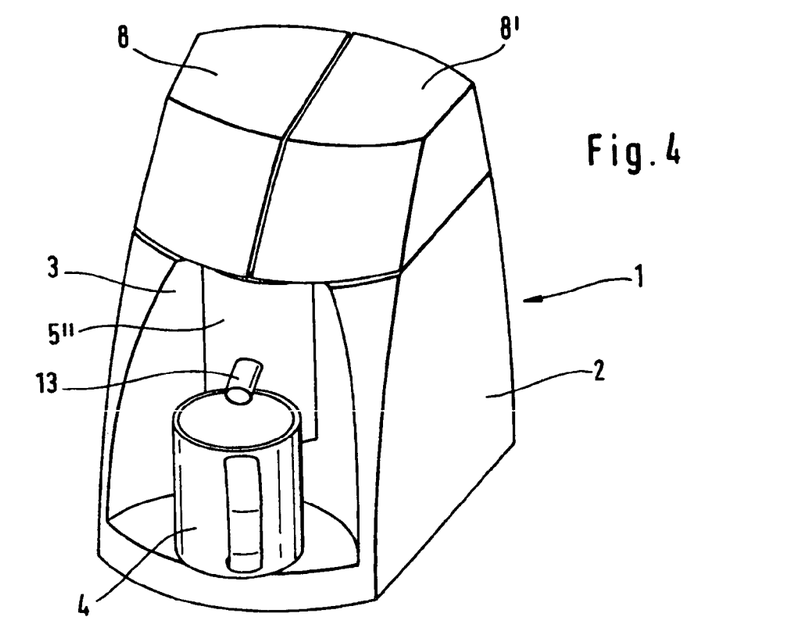
FIG. 4 is a perspective view of a third embodiment of an apparatus for the preparation of beverages in the working position.
Figure 5:
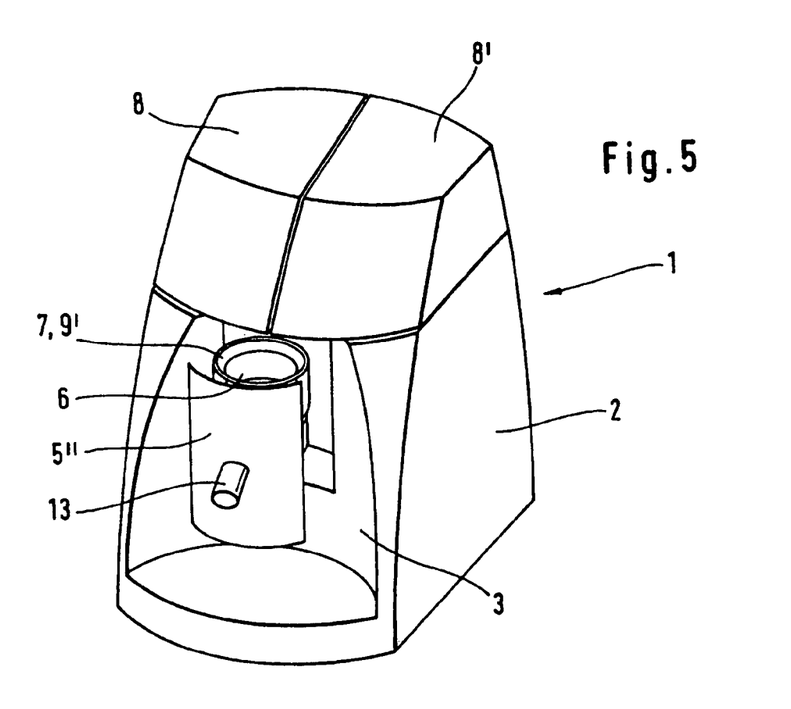
FIG. 5 shows the apparatus from FIG. 4 in the feed position.

In FIGS. 4 and 5, the receiver 5' is linearly displaceable as a push unit between the working position and the feed position whereas in FIGS. 2 and 3 the receiver 5' can be swiveled about a horizontal swivel axis in its lower front region between the working position and the feed position. In the feed position, the filling opening 7 of the mixing chamber 6 is exposed and at the same time forms a feed opening 9' for manual pouring of the further powdery soluble extract.

Figure 8:
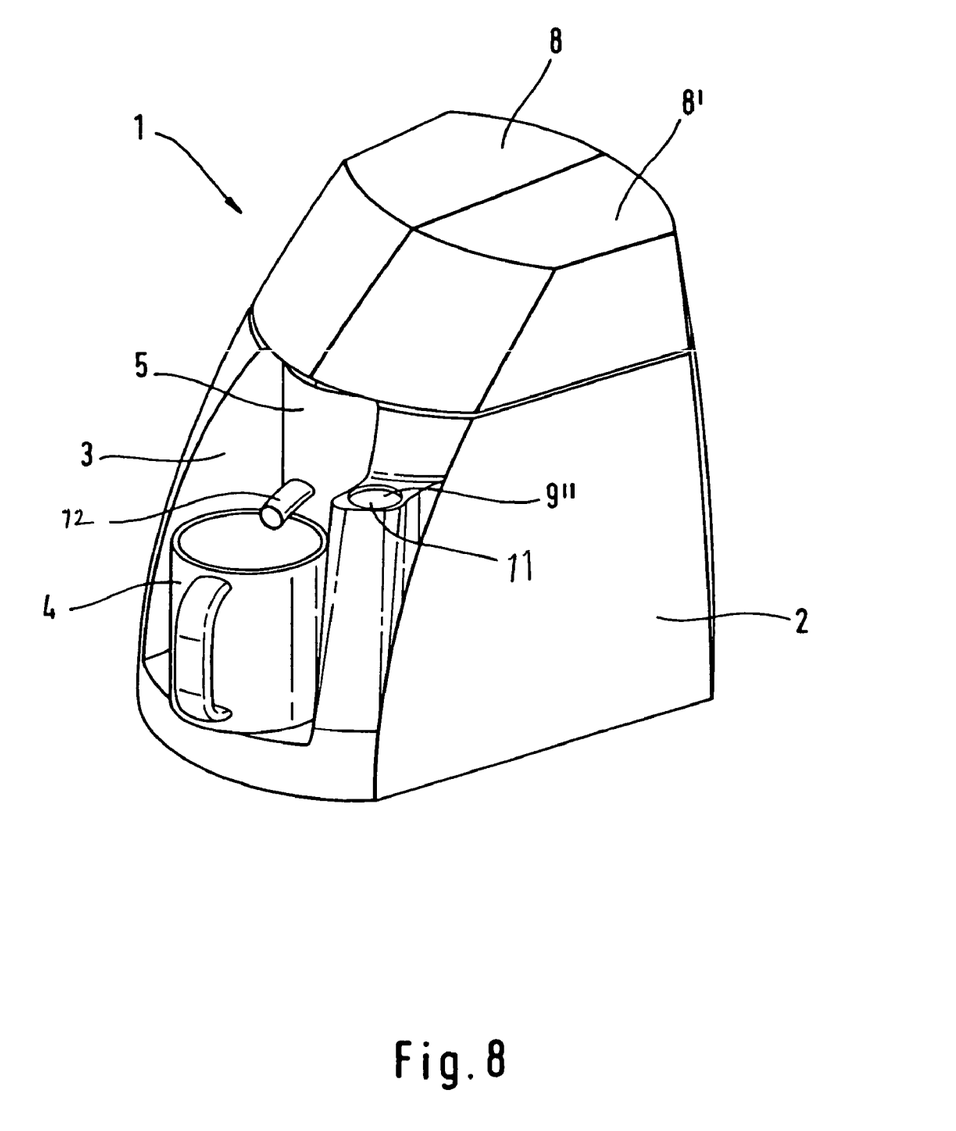
FIG. 8 is a perspective view of a fifth embodiment of an apparatus for the preparation of beverages.

In FIG. 8, a separate feed chamber 11, having an opening in its upper region, is constructed in the base section 2. The opening in the upper region forms a feed opening 9" through which a further powdery soluble extract can be poured manually into the feed chamber 11.

The further extract can be conveyed from the feed chamber 11 to the mixing chamber 6 by means of a transport system not shown.

Referring again to FIG. 8, an outlet connecting piece 12 leads outwards from the mixing chamber 6, from which outlet the ready beverage can flow directly into the drinking vessel 4 standing in the drinking vessel recess 3.

FIGS. 9-15 show a mixing chamber 6 which is constructed with a funnel-shaped bottom region 14. At the lowest point of the bottom region 14 there is constructed a through outlet 15 which leads to a cream chamber 16 located below the mixing chamber 6. The bottom region of the cream chamber 16 is constructed as sloping, with an outlet opening 17 leading outwards at the lowest point of the bottom region 14.

The mixing chamber 6 is open at the top and has an approximately radially inwardly directed circumferential collar 13 on its circumferential opening edge. The central opening of the collar 13 forms the feed opening 9 of the mixing chamber 6 through which first the powdery soluble extract and then hot water from a hot water supply 18 are poured into the mixing chamber 6.

Under the bottom area of the cream chamber 31, there is an electric motor 20 located in a motor chamber 19, whose drive shaft 21 is fed in a sealed fashion through a feed-in opening 23 in the bottom 22 (shown in FIG. 11), which projects coaxially through the cream chamber 16 and the outlet 15 and ends with its free end at approximately half the height of the conical bottom region 14 of the mixing chamber 6.

On an arm 24 which projects radially into the outlet 15 a bearing bush 25 is located in which the drive shaft 21 is pivoted. The free end of the drive shaft 21 bears a circular disk-shaped mixing rotor 26 which extends radially from the drive shaft 21. The mixing rotor 26 is rotationally fixed in the mixing chamber 6.

Figure 9:
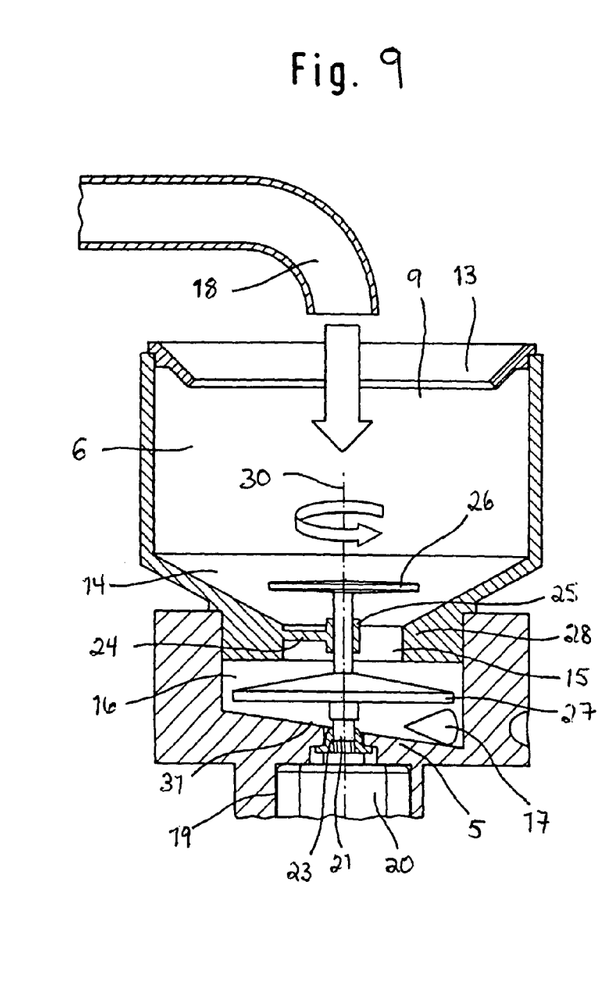
FIG. 9 shows a cross-sectional view through a first embodiment of the mixing device.
Figure 10:
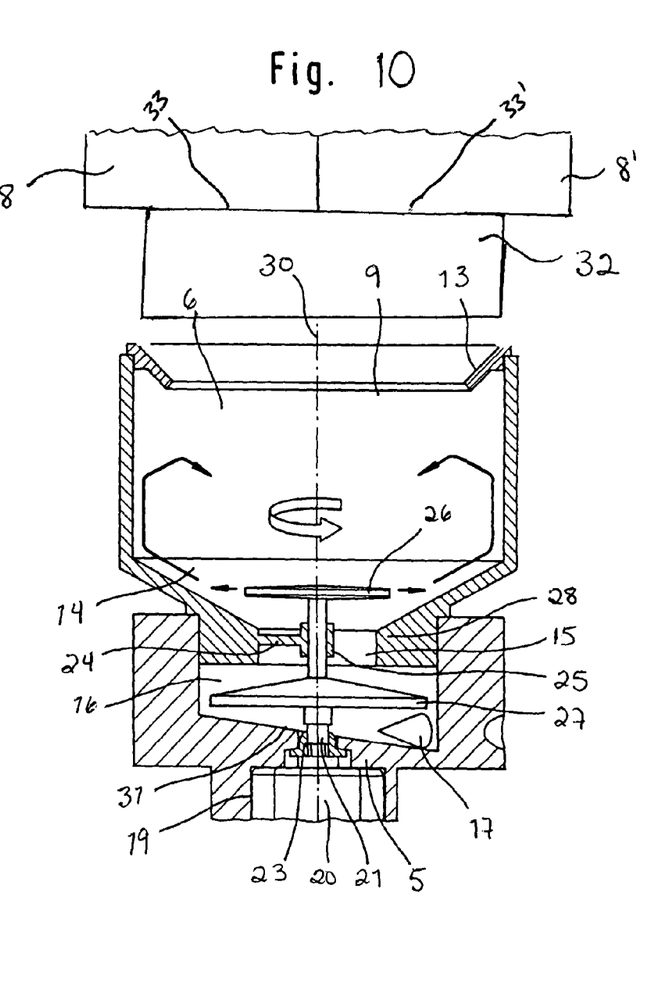
FIG. 10 shows the mixing device from FIG. 9 and the flow paths of the mixed liquid.

In the cream chamber 16 a first cream rotor 27, 27' is also arranged rotationally fixed on the drive shaft 21. In FIGS. 9 and 10, the first cream rotor 27 is also constructed as circular disk-shaped and radially extending. The surface of the first cream rotor 27 facing the mixing chamber 6 is inclined away from the mixing chamber 6 towards its circumferential edge starting from the drive shaft 21.

Figure 11:
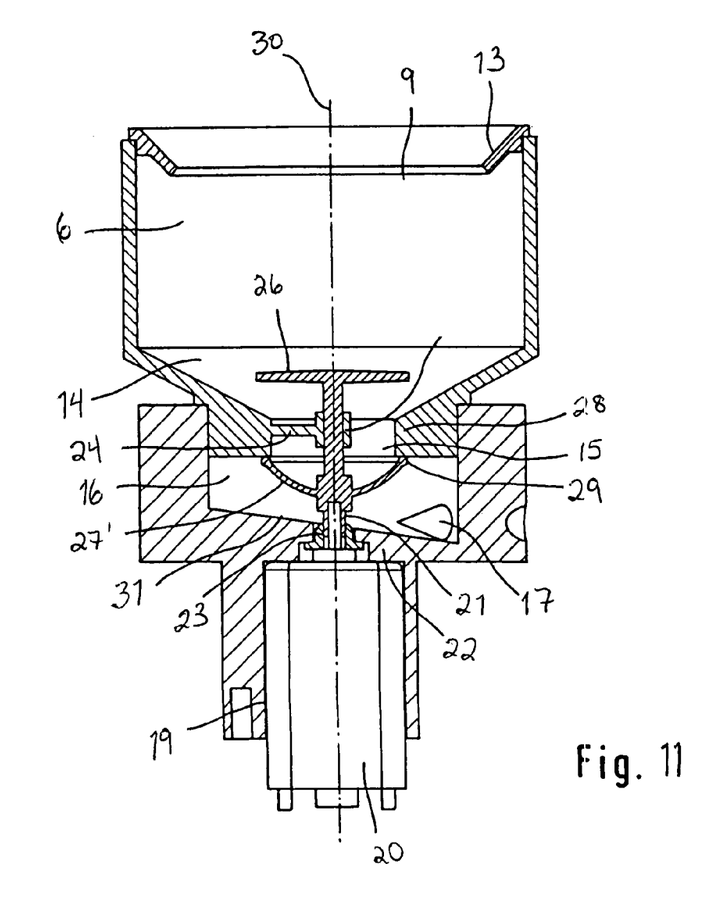
FIG. 11 shows a cross-sectional view through a second embodiment of a mixing device.
Figure 12:
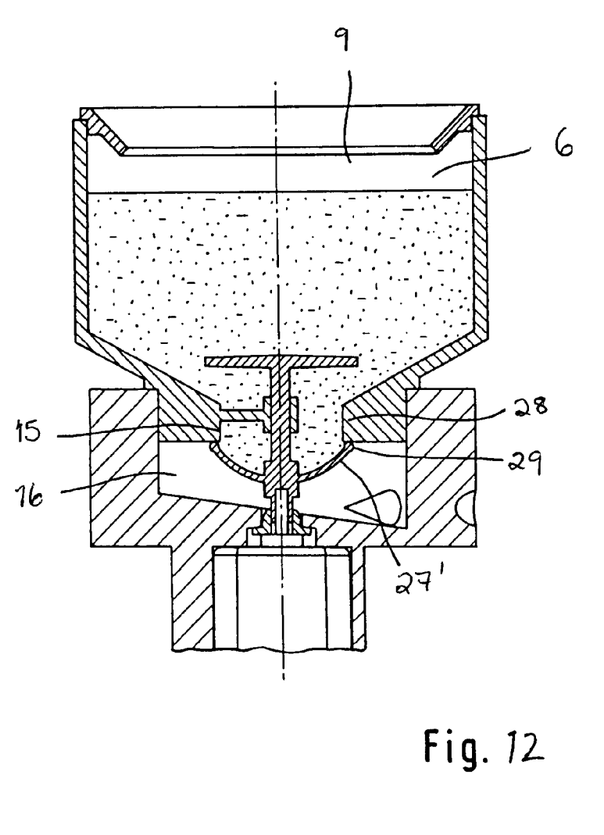
FIG. 12 shows the mixing device from FIG. 11 with the mixing chamber filled and the outlet of the mixing chamber closed.
Figure 13:
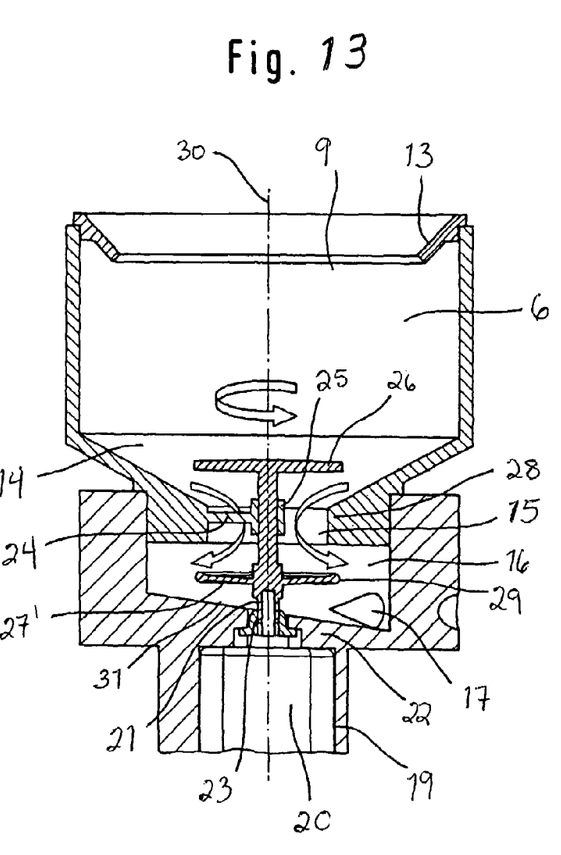
FIG. 13 shows the mixing device from FIG. 11 with the outlet of the mixing chamber open.
Figure 14:
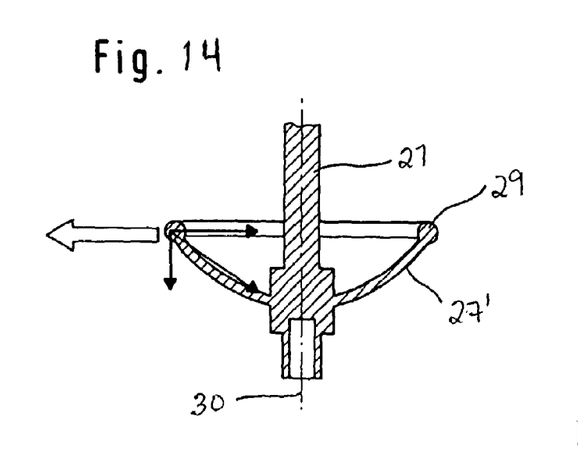
FIG. 14 shows a cross-sectional view through the non-rotatably driven first cream rotor of the mixing device from FIG. 11.
Figure 15:
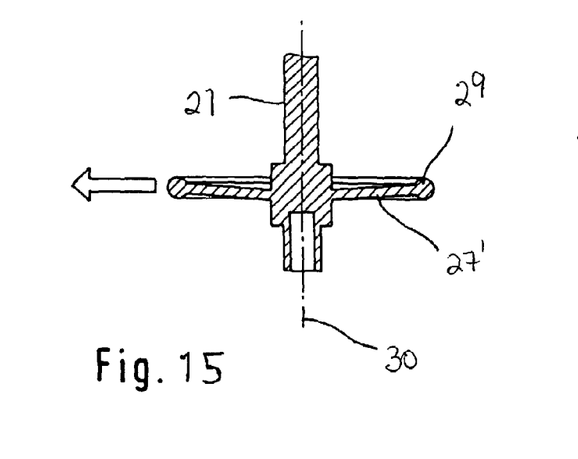
FIG. 15 shows a cross-sectional view through the rotatably driven first cream rotor of the mixing device from FIG. 11.

In FIGS. 11 to 15 the first cream rotor 27' is made of an elastic material and provided with a pre-stress which deforms it into a cup shape. In the non-rotating state of the first cream rotor 27', as shown in FIGS. 11, 12 and 14, the first cream rotor 27' is arched in a cup shape with its circumferential edge towards the dividing wall 28 between the mixing chamber 6 and the first cream rotor 27. A sealing bead 29 molded on the circumferential edge of the first cream rotor 27' abuts against the dividing wall 28 enclosing the outlet 15, thereby creating a seal between the mixing chamber 6 and the cream chamber 16. As a result of the outlet 15 being sealed, the mixing chamber can be filled with the powdery soluble extract and the hot water without this liquid being able to escape through the outlet 15 into the cream chamber 16. As a result of a subsequent rotating drive of the mixing rotor 26 and first cream rotor 27' about an axis of rotation 30 by the electrical motor 20, the centrifugal forces acting on the first cream rotor 27' (FIG. 14) lead to an elastic deformation of the first cream rotor 27' until it acquires an approximately elongated disk shape (FIGS. 13 and 15). The outlet 15 is thereby opened and the liquid-extract combination, after having been mixed by the rotating mixing rotor 26 in the mixing chamber 6, can flow onto the first cream rotor 27'. The liquid-extract combination, forming a thin liquid film on the first cream rotor 27', is then thrown radially outwards and permeated with fine air bubbles such that a frothy cream is formed. Together with the liquid-extract combination, the cream flows through the outlet opening 17 into a drinking vessel 4.

After the rotating drive has stopped, the first cream rotor 27' again acquires its shape shown in FIGS. 11, 12 and 14 as a result of its pre-stressing and closes the outlet 15 again.

In FIGS. 9 and 10, after pouring in the powdery soluble extract, the hot water is poured in and at the same time the rotating drive of the drive shaft 21, the mixing rotor 26, and the first cream rotor 27 are activated and rotate about an axis of rotation 30. The hot water impacting on the surface of the mixing rotor 26, forming a thin film of water on the mixing rotor, is thrown radially outwards so that after leaving the mixing rotor 26 the water film breaks up into small water droplets which impact at high speed on the powdery extract and the slopes of the conical bottom region 14 of the mixing chamber 6. There, as shown in FIG. 10, they are deflected upwards to the cylindrical region of the mixing chamber 6 and after using up their kinetic energy, fall radially inwards and then from above again onto the mixing rotor 26. Since most of the liquid passes through this cycle several times and only parts of the liquid flow through the outlet 15 onto the first cream rotor 27, the result is very thorough mixing of water and extract and breaking up of the extract. When the mixed liquid impacts on the first cream rotor 27, a very frothy cream is produced in the same fashion is shown in FIGS. 11-15, which flows together with the liquid-extract mix via the outlet opening 17 into a drinking vessel.

In FIGS. 11 to 15, mixing of the liquid with the extracts takes place in a similar fashion as that shown in FIGS. 9 and 10. The liquid which is thrown radially by the mixing rotor 26 completes a repeated cycle as shown in FIG. 10 before it gradually impacts on the first cream rotor 27' through the outlet 15.

A number of embodiments of the invention have been described. Nevertheless, it will be understood that various modifications may be made without departing from the spirit and scope of the invention.

What is claimed is:

1. A beverage mixer and dispenser, comprising:
   a housing defining
      a mixing chamber in which powdery drink extract and hot water can be joined to produce hot beverages, the mixing chamber defining a lower outlet; and
      a cream chamber disposed below the mixing chamber and arranged to receive hot beverages from the outlet of the mixing chamber;
      a rotatable mixing rotor disposed within the mixing chamber to mix the hot water and powdery drink extracts; and
      a rotatable first cream rotor disposed within the cream chamber to aerate the hot beverage, the cream chamber defining an outlet through which the aerated beverage is dispensed into a receiving vessel for consumption,
   wherein the first cream rotor is approximately cup-shaped in a non-rotating state, the circumferential edge of the first cream rotor abutting against a dividing wall between the mixing chamber and the cream chamber, thereby creating a seal between the mixing chamber and the cream chamber, and, wherein, in a rotating state, the first cream rotor flattens under centripetal force.

2. The beverage mixer and dispenser of claim 1, further comprising an extract container positioned above the mixing chamber, the extract container containing a quantity of powdery drink extract.

3. The beverage mixer and dispenser of claim 2, further comprising a metering device disposed below the extract container for dispensing a metered amount of drink extract from the extract container into the mixing chamber for mixing with hot water.

4. The beverage mixer and dispenser of claim 1, wherein the mixing chamber defines a filling opening through which the drink extract is dispensed into the mixing chamber, the housing further defining a feed opening leading into the mixing chamber, for manual addition of drink additives into the mixing chamber.

5. The beverage mixer and dispenser of claim 4, wherein the mixing chamber is in a chamber housing moveable between a first position, in which the filling opening is directly below a metering device, and a second position, in which the feed opening is exposed for adding drink additives.

6. The beverage mixer and dispenser of claim 4, wherein the housing further defines a feed chamber that defines the feed opening, the feed chamber being connected to the mixing chamber by means of a transport system.

7. The beverage mixer and dispenser of claim 5, wherein the housing is linearly translatable between the first and second positions.

8. The beverage mixer and dispenser of claim 5, wherein the housing is pivotable between the first and second positions, about an axis.

9. The beverage mixer and dispenser of claim 4, wherein a portion of the filling opening of the mixing chamber is covered by an extract container and another portion of the filling opening forms the feed opening.

10. The beverage mixer and dispenser of claim 9, wherein the other part of the filling opening forming the feed opening is closeable by a lid, and opening such lid makes the feed opening accessible.

11. The beverage mixer and dispenser of claim 10, wherein the lid is pivoted on the housing.

12. The beverage mixer and dispenser of claim 1, wherein a lower portion of the mixing chamber is funnel-shaped.

13. The beverage mixer and dispenser of claim 12, wherein the mixing rotor is disposed in the lower portion of the mixing chamber.

14. The beverage mixer and dispenser of claim 1, wherein the mixing rotor is smooth.

15. The beverage mixer and dispenser of claim 1, wherein the mixing rotor is a circular disk.

16. The beverage mixer and dispenser of claim 1, wherein the mixing rotor is driven by a shaft extending from a lower surface of the mixing rotor.

17. The beverage mixer and dispenser of claim 1, wherein the first cream rotor is smooth.

18. The beverage mixer and dispenser of claim 1, wherein the first cream rotor is driven by a shaft extending from a lower surface of the first cream rotor.

19. The beverage mixer and dispenser of claim 1, further comprising a ring-shaped sealing bead along a circumferential edge of the cup-shaped first cream rotor.

20. The beverage mixer and dispenser of claim 1, further comprising a second cream rotor located below the first cream rotor and rotationally fixed on a drive shaft, and extending approximately radially in a disk shape.

21. The beverage mixer and dispenser of claim 20, wherein the second cream rotor has a larger diameter than the first cream rotor.

22. The beverage mixer and dispenser of claim 1, further comprising a valve disposed between the mixing chamber and the cream chamber to block flow through the outlet of the mixing chamber.

23. The beverage mixer and dispenser of claim 22, wherein the valve comprises a circumferential edge of the first cream rotor.

24. The beverage mixer and dispenser of claim 1, further comprising a water inlet directed into the mixing chamber, the water inlet being arranged to impinge water directly on the mixing rotor.

25. The beverage mixer and dispenser of claim 24, wherein the water inlet directs water into the mixing chamber coaxially along the axis of the mixing rotor.

26. The beverage mixer and dispenser of claim 1, wherein the first cream rotor and the mixing rotor are driven by a single motor, and are arranged coaxially along an axis of rotation.

27. The beverage mixer and dispenser of claim 1, wherein the first cream rotor and the mixing rotor are rotatably drivable about a common axis of rotation.

* * * * *